United States Patent
Autran

(10) Patent No.: US 11,170,241 B2
(45) Date of Patent: Nov. 9, 2021

(54) DEVICE FOR DETERMINING THE ATTENTIVENESS OF A DRIVER OF A VEHICLE, ON-BOARD SYSTEM COMPRISING SUCH A DEVICE, AND ASSOCIATED METHOD

(71) Applicant: VALEO COMFORT AND DRIVING ASSISTANCE, Créteil (FR)

(72) Inventor: Frédéric Autran, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 5 days.

(21) Appl. No.: 16/490,767

(22) PCT Filed: Feb. 23, 2018

(86) PCT No.: PCT/EP2018/054586
§ 371 (c)(1),
(2) Date: Sep. 3, 2019

(87) PCT Pub. No.: WO2018/158163
PCT Pub. Date: Sep. 7, 2018

(65) Prior Publication Data
US 2020/0012872 A1  Jan. 9, 2020

(30) Foreign Application Priority Data
Mar. 3, 2017 (FR) ....................... 1700222

(51) Int. Cl.
*G06K 9/00* (2006.01)
*G05D 1/00* (2006.01)
(Continued)

(52) U.S. Cl.
CPC ....... *G06K 9/00845* (2013.01); *G05D 1/0061* (2013.01); *G05D 1/0088* (2013.01);
(Continued)

(58) Field of Classification Search
CPC .......... G06T 2207/10081; G06T 7/155; G06T 2207/10072; G06T 2207/10088;
(Continued)

(56) References Cited

U.S. PATENT DOCUMENTS 7,983,817 B2 * 7/2011 Breed .................... B60N 2/002
250/578.1
9,463,793 B2 * 10/2016 Lind ..................... B60W 30/00
(Continued)

FOREIGN PATENT DOCUMENTS

WO  WO-2013157466 A1 * 10/2013 .............. F24F 11/62
WO  2014/128273 A1  8/2014

OTHER PUBLICATIONS

International Search Report and Written Opinion issued in corresponding International Application No. PCT/EP2018/054586, dated Jul. 23, 2019 (29 pages).
(Continued)

*Primary Examiner* — David N Werner
(74) *Attorney, Agent, or Firm* — Osha Bergman Watanabe & Burton LLP

(57) ABSTRACT

A device (10) for determining a state of attentiveness of a driver of a vehicle (1) is disclosed. The device includes an image capture unit (11) onboard said vehicle (1), said image capture unit (11) being suitable for capturing at least one image of a detection area (D) located in said vehicle (1), and an image processing unit (15) suitable for receiving said captured image and programmed to determine the state of attentiveness of the driver (4), according to the detection of the presence of a distracting object in one of the hands of the driver (4), which hand being located in the detection area (D).

12 Claims, 1 Drawing Sheet

Figure 1:
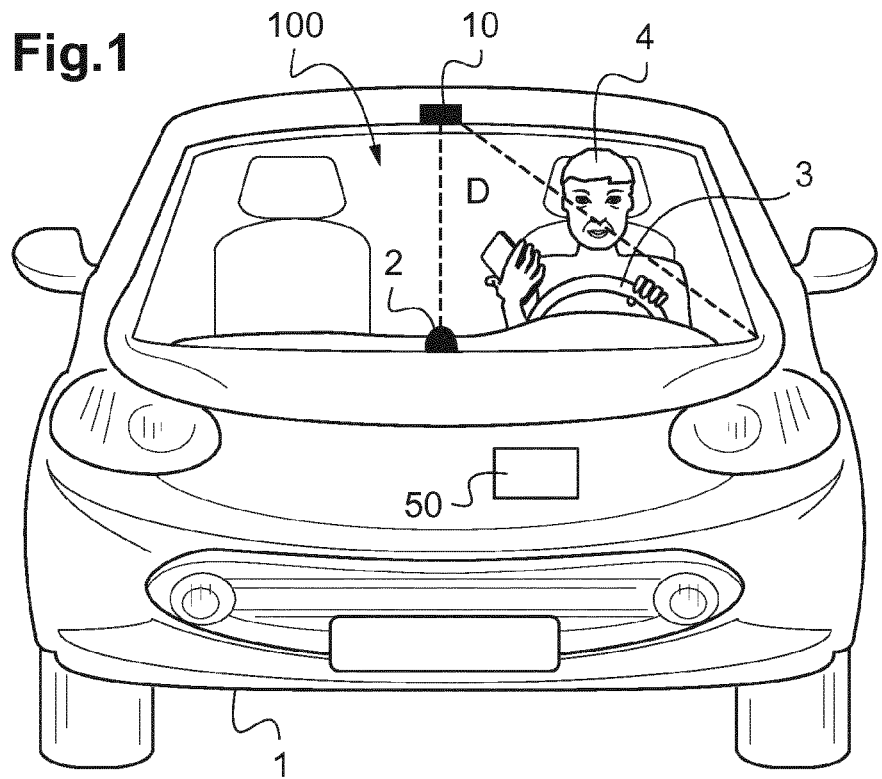

(51) Int. Cl.
  *G06K 9/62* (2006.01)
  *H04N 13/204* (2018.01)
  *H04N 13/271* (2018.01)

(52) U.S. Cl.
  CPC ....... *G06K 9/00375* (2013.01); *G06K 9/6284*
  (2013.01); *H04N 13/204* (2018.05); *H04N 13/271* (2018.05)

(58) Field of Classification Search
  CPC . G06T 2207/10132; G06T 2207/20101; G06T 2207/20104; G06T 2207/20152; G06T 2207/20156; G06T 2207/30008; G06T 7/0012; G06T 7/11; G06T 7/12; G06T 11/001; G06T 15/205; B60K 28/066; B60W 2540/22; B60W 50/14; B60W 2040/0818; B60W 2420/42; B60W 2520/10; B60W 2530/20; B60W 2540/043; B60W 2540/221; B60W 2552/05; B60W 2555/20; B60W 2556/50; B60W 30/09; B60W 30/0953; B60W 30/0956; B60W 40/08; B62D 1/046; B62D 1/065; B62D 15/025; B62D 15/0265; B62D 5/003; B62D 5/006; B62D 6/00; G06K 9/00845; G06K 9/6284; G05D 1/0061; G05D 1/0088; H04N 13/204; H04N 13/271

See application file for complete search history.

(56) References Cited

U.S. PATENT DOCUMENTS

| | | | | |
|---|---|---|---|---|
| 9,928,433 | B1* | 3/2018 | Chan | G06F 16/5854 |
| 9,988,008 | B2* | 6/2018 | Thieberger | G06T 19/006 |
| 10,059,347 | B2* | 8/2018 | Thieberger-Navon | B60W 50/0097 |
| 2003/0117275 | A1* | 6/2003 | Watkins | B60C 23/20 |
| | | | | 340/442 |
| 2005/0131607 | A1* | 6/2005 | Breed | B60R 21/0152 |
| | | | | 701/45 |
| 2008/0080741 | A1* | 4/2008 | Yokoo | B60R 21/01538 |
| | | | | 382/104 |
| 2009/0034794 | A1* | 2/2009 | Ishikawa | B60R 21/01538 |
| | | | | 382/103 |
| 2009/0278915 | A1 | 11/2009 | Kramer et al. | |
| 2012/0235819 | A1* | 9/2012 | Watkins | A61B 5/18 |
| | | | | 340/573.1 |
| 2013/0207805 | A1* | 8/2013 | Inada | B60K 28/066 |
| | | | | 340/576 |
| 2015/0283998 | A1* | 10/2015 | Lind | B60W 30/17 |
| | | | | 701/23 |
| 2015/0379362 | A1* | 12/2015 | Calmes | G06T 7/20 |
| | | | | 348/136 |
| 2016/0001781 | A1* | 1/2016 | Fung | B60K 28/02 |
| | | | | 701/36 |
| 2016/0165154 | A1* | 6/2016 | Shinomiya | G06F 3/0304 |
| | | | | 348/164 |
| 2016/0214618 | A1* | 7/2016 | Wulf | B60W 50/14 |
| 2017/0021728 | A1* | 1/2017 | Wild | B60K 37/06 |
| 2017/0061222 | A1* | 3/2017 | Hoye | G06K 9/00791 |
| 2017/0243389 | A1* | 8/2017 | Wild | G06T 11/001 |
| 2017/0344838 | A1* | 11/2017 | Zhou | G06T 7/77 |
| 2017/0357866 | A1* | 12/2017 | Welland | G06K 9/6293 |
| 2018/0043829 | A1* | 2/2018 | Cordell | G08G 1/143 |
| 2018/0096668 | A1* | 4/2018 | Surnilla | B60K 35/00 |
| 2018/0231976 | A1* | 8/2018 | Singh | B60W 30/12 |
| 2018/0326999 | A1* | 11/2018 | Hershkovitz | B60W 50/14 |
| 2019/0009793 | A1* | 1/2019 | Wulf | B60W 50/087 |
| 2019/0213429 | A1* | 7/2019 | Sicconi | G06F 3/016 |

OTHER PUBLICATIONS

Berri Rafael A et al: "A pattern recognition system for detecting use of mobile phones while driving", 2014 International Conference on Computer Vision Theory and Applications (VISAPP), Scitepress, vol. 2, Jan. 5, 2014, pp. 411-418 (9 pages).

Alberto Fernandez et al: "Driver Distraction Using Visual-Based Sensors and Alogrithms", Sensors, vol. 16, No. 12, Oct. 28, 2016, p. 1805 (44 pages).

* cited by examiner

DEVICE FOR DETERMINING THE ATTENTIVENESS OF A DRIVER OF A VEHICLE, ON-BOARD SYSTEM COMPRISING SUCH A DEVICE, AND ASSOCIATED METHOD

TECHNICAL FIELD TO WHICH THE INVENTION RELATES

The present invention relates to a device for determining the state of attentiveness of a vehicle driver.

It also relates to an onboard system including such a device.

It also relates to a method associated with such a device.

Lastly, it is applied particularly advantageously to the case of driverless vehicles, notably driverless motor vehicles.

TECHNOLOGICAL BACKGROUND

Monitoring the driver of a motor vehicle with the aid of a monitoring device suitable for determining a state of vigilance of the driver and notably to prevent falling asleep at the steering wheel is known. According to the state of vigilance determined, the monitoring device alerts the driver in order to avoid putting him-/herself in a dangerous situation.

Such a monitoring device deduces the state of vigilance of the driver according to behavioral parameters associated with the driver and/or operational parameters of the vehicle. In practice, the behavioral parameters, for example the eyelid closure rate or the gaze direction, are obtained by analyzing images of the head of the driver, and the operational parameters of the vehicle, for example parameters relating to an angle of rotation of the steering wheel, to a speed of the vehicle or to the action of the driver on certain buttons, are obtained from physical sensors on the vehicle.

However, in some cases it can be necessary to know not only the state of vigilance of the driver, but also his/her general state of attentiveness, which is not always possible based on only behavioral parameters associated with the face of the driver and/or operational parameters of the vehicle.

OBJECT OF THE INVENTION

In order to address the abovementioned drawback of the prior art, the present invention proposes an onboard device for determining a state of attentiveness of a vehicle driver.

More particularly, there is proposed according to the invention a device for determining a state of attentiveness of a vehicle driver including:

an image capture unit onboard said vehicle, said image capture unit being suitable for capturing at least one image of a detection area located in said vehicle, and an image processing unit suitable for receiving said captured image and programmed to determine the state of attentiveness of the driver, according to the detection of the presence of a distracting object in one of the hands of the driver, which hand being located in the detection area.

In the sense of the invention, a distracting object is an object other than an item of driving equipment of the vehicle. It is an object capable of distracting the driver from his/her driving, and occupying his/her hand such that said distracting object prevents the driver from interacting in complete safety with the driving equipment of the vehicle.

Thus, the device according to the invention provides for determining the state of attentiveness of the driver according to a state of occupation of at least one of the hands of the driver from among an "occupied" state in which the hand is holding a distracting object, and a "free" state in which it is free to interact with the driving equipment of the vehicle since it is not holding any distracting object. When at least one of the hands is in an occupied state, the driver is in a lower attentive state than when both hands are in a free state since the driver is running the risk of being hindered from intervening rapidly on the driving equipment of the vehicle if he/she is holding a distracting object in his/her hand.

Other nonlimiting and advantageous features of the device according to the invention are as follows:

the image capture unit comprises at least one sensor suitable for capturing a three-dimensional image of the detection area, said three-dimensional image including information relating to the distance, with respect to said sensor, at least of said distracting object and/or of said hand located in the detection area;

the image capture unit comprises at least one sensor suitable for capturing at least one image of a first kind including a first type of information relating to said distracting object and/or to said hand located in the detection area, and a sensor suitable for capturing at least one image of a second kind different from the first kind, including a second type of information relating to said distracting object and/or to said hand located in the detection area;

the image of a first kind is chosen from among: a three-dimensional image including information relating to the distance, with respect to said sensor, at least of said distracting object and/or of said hand located in the detection area, a two-dimensional image including information relating to the brightness at least of said distracting object and/or of said hand located in the detection area, and a thermal image including information relating to the temperature at least of said distracting object and/or of said hand located in the detection area (the image of a second kind itself also able to be chosen from among the abovementioned kinds of image, while being of a kind different from the first kind as already indicated);

the image capture unit additionally comprises at least one sensor suitable for capturing an image of a third kind different from said first and second kinds, including a third type of information relating to said object and/or to said hand located in the detection area;

the image of a third kind is chosen from among: a three-dimensional image including information relating to the distance, with respect to said sensor, at least of said distracting object and/or of said hand located in the detection area, a two-dimensional image including information relating to the brightness at least of said distracting object and/or of said hand located in the detection area, and a thermal image including information relating to the temperature at least of said distracting object and/or of said hand located in the detection area;

the image processing unit is programmed to implement the following steps:

b1) locate said hand of the driver in said image received from the image capture unit, b2) detect the presence of said distracting object in said hand of the driver in order to deduce the state of attentiveness of the driver;

the image processing unit is programmed to implement step b1) according to the following substeps:

detect at least a part of an arm of the driver, in the image received from the image capture unit, and deduce the position, in said image received from the image capture unit, of said hand of the driver based on the place where the part of the arm of the driver is detected in the image received from the image capture unit;

the image processing unit is programmed to implement step b2) according to the following substeps:

detect the presence of any object in the hand of the driver, and determine the nature of said detected object in the hand of the driver, in order to deduce the state of attentiveness of the driver;

the image processing unit implements step b1) based on the image of a first kind, and step b2) based on the image of a kind different from the first kind.

the image processing unit implements steps b1) and b2) from each image received from the image capture unit, and implements an additional step according to which it determines an index of confidence associated with the detection of the presence of the distracting object in the hand of the driver according to which index it deduces the state of attentiveness of the driver;

the image processing unit comprises processing means using a neural network trained to determine the state of attentiveness of the driver based on the image of the detection area captured by the image capture unit.

The invention relates also to an onboard system for a vehicle including:

a device according to the invention, suitable for determining the state of attentiveness of the driver, an autonomous driving unit of said vehicle programmed to control driving equipment of said vehicle independently of the driver, and a decision unit programmed to allow the driver to control, at least partly, the driving equipment of the vehicle in the event that the hand of the driver (or at least one of the two hands, or both hands) is determined to be in a free state and/or to alert the driver in the event that the hand of the driver is determined to be in an occupied state, and/or to make the autonomous driving switch over to a safe mode.

Thus, when the vehicle is a driverless motor vehicle, i.e. its driving equipment is controlled independently of the driver, the driver will not be able to take back control, even partial control, of the vehicle driving equipment, if the occupation state of his/her hand is determined as being "occupied". If the hand of the driver is determined to be in an occupied state, the driverless vehicle can be led by the decision unit of the onboard system to park on the shoulder (or on the emergency shoulder), in accordance with the abovementioned safe mode.

In the case of a manually driven or semi-autonomous vehicle, the detection of a distracting object in at least one of the hands of the driver can for example be followed by an alert to the driver about the risk being taken.

Lastly, the invention proposes a method for determining a state of attentiveness of a vehicle driver, according to which a) an image capture unit onboard said vehicle captures at least one image of a detection area located in said vehicle, and b) an image processing unit receives said captured image and determines the state of attentiveness of the driver, according to the detection of the presence of a distracting object in at least one of the hands of the driver, which hand being located in the detection area.

Advantageously, when the driving equipment of said vehicle is controlled independently of the driver, provision is additionally made for a step according to which the driver is allowed to control, at least partly, the vehicle driving equipment in the event that one of the hands of the driver is determined to be in a free state and/or the driver is alerted in the event that one of said hands of the driver is determined to be in an occupied state and/or the autonomous driving is made to switch over to a safe mode.

The method which has just been proposed can moreover optionally include steps such as those proposed earlier relating to the device for determining a state of attentiveness of the driver (in particular steps b1) and b2) and the possible substeps for these steps).

DETAILED DESCRIPTION OF AN EXAMPLE EMBODIMENT

The following description with reference to the accompanying drawings, given by way of nonlimiting examples, will provide a good understanding of what the invention consists of and how it can be produced.

Figure 2:
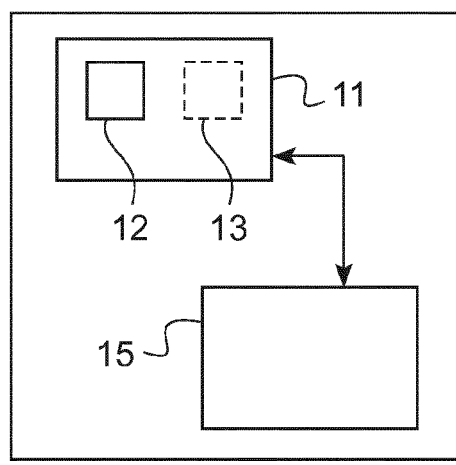
Figure 3:
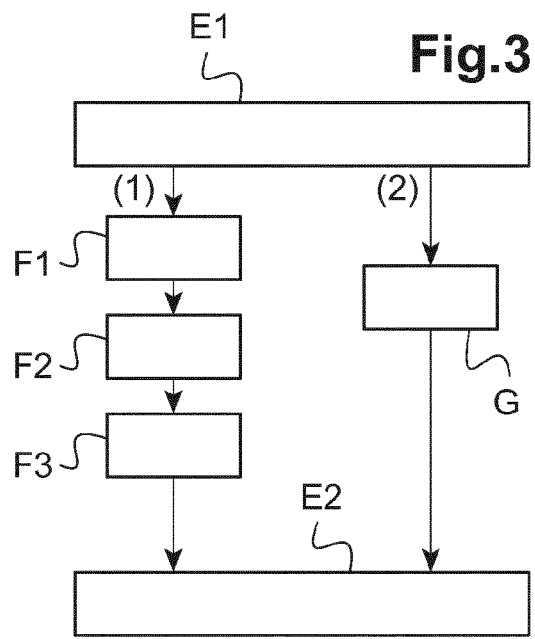

In the accompanying drawings:

FIG. 1 schematically represents, in a view from the front, a motor vehicle comprising a device according to the invention;

FIG. 2 schematically represents the device of FIG. 1 according to two possible embodiments: a first embodiment (in solid line) in which the image capture unit 11 comprises only one sensor 12, and a second embodiment in which the image capture unit 11 comprises two sensors 12, 13 (in solid line and dotted line, the sensor 13 being represented in dotted line); and FIG. 3 represents a flow chart of the main steps of the method according to the invention.

DEVICE

In FIG. 1, there is represented the front of a motor vehicle 1 having onboard a device 10 for determining a state of attentiveness of a driver of the vehicle 1.

More specifically, such a device 10 is suitable for determining the state of attentiveness of the driver 4 according to an occupation state of at least one of the hands of said driver 4 of the vehicle 1.

Thus, such a device 10 is suitable for detecting at least one of the hands of the driver in a detection area D of the vehicle 1, and for determining the occupation state of this (or these) hand(s) in order to deduce the state of attentiveness of the driver.

The occupation state is determined from among an "occupied" state in which the hand is holding a distracting object, and a "free" state in which it is not holding a distracting object. In this free state, the hand can for example be engaged in driving the vehicle, i.e. acting on driving equipment of the vehicle, or be empty, for example at rest on an armrest.

In the sense understood here, the distracting object is an object other than driving equipment of the vehicle. It is for example a mobile phone, a book, a road map, a satellite navigation system, etc. The items of driving equipment accessible to the hands of the driver are for example the steering wheel 3, the gearshift, controls (turn signal or windshield wiper levers), switches (such as hazard warning lights) or the handbrake.

As FIG. 2 shows, the device according to the invention includes:

- an image capture unit 11 onboard said vehicle 1, said image capture unit 11 being suitable for capturing at least one image of the detection area D located in said vehicle 1, and
- an image processing unit 15 suitable for receiving said captured image and programmed to determine the occupation state of the hand of the driver 4, which hand being located in the detection area D, according to the detection of the presence of a distracting object in said hand.

In this case, the image capture unit 11 is fitted in the motor vehicle, i.e. arranged inside the vehicle 1, more specifically inside the passenger compartment of the vehicle 1.

The image capture unit 11 comprises at least one sensor 12, 13 suitable for capturing an image of a first kind, of the detection area D.

As represented in FIG. 1, the detection area D is located between the gearshift 2 and the driver-side front door. The detection area D thus encompasses the steering wheel 3 of the vehicle 1 and contains both hands of the driver. To capture such a detection area D, the sensor 12, 13 of the image capture unit 11 is for example placed in a front ceiling lamp of the motor vehicle 1, such that it has the detection area D in view from above.

As a variant, the sensor could be placed on the vehicle instrument panel, in a central area of the latter, such that the detection area would be viewed from front. Depending on the angle of opening of the sensor, the detection area could contain only one of the two hands of the driver.

As another variant, the sensor could be placed behind the steering wheel 3 of the vehicle, at the dashboard. The detection area could then easily contain the right hand and left hand of the driver.

Any other placement providing for containing the hands of the driver in the field of vision of the sensor 12, 13 can also be envisaged in order to arrange the sensor.

According to a first embodiment of the device 10 according to the invention, represented in FIG. 2 in solid line, the image capture unit comprises only one sensor 12 suitable for capturing a three-dimensional image of the detection area D, said three-dimensional image including information relating to the distance, with respect to said sensor, of at least a part of the elements in the space which are contained in the detection area D.

These elements in the space notably comprise the hands of the driver 4 and the distracting object possibly present in the detection area D. The elements in the space can also comprise elements of the driver environment, for example elements of the passenger compartment of the vehicle and of the driving equipment of the vehicle such as the gearshift, the steering wheel, an armrest, etc.

The three-dimensional image includes a point cloud representing the envelope of the elements in the space which are present in the detection area D, including that of the hand of the driver, the forearm of the driver and the distracting object able to be present there. The point cloud thus gives information regarding the position in space of the elements in the space which are present in the detection area D, notably information relating to their distance with respect to said sensor.

Such a sensor 12 suitable for capturing three-dimensional images is known to the person skilled in the art and will not be described in detail. It will merely be clarified that this could be a time-of-flight sensor, such as a time-of-flight (ToF) camera suitable for sending light to the driver 4 and measuring the time that this light takes to return to said time-of-flight sensor in order to deduce the three-dimensional image of the detection area D. As a variant, it could be a stereoscopic sensor including at least two cameras, each capturing an image of the detection area according to its specific point of view, the images of each camera then being combined to deduce the three-dimensional image of the detection area. It can also be a structured light sensor suitable for projecting a pattern on the detection area and for analyzing the deformation of this pattern to deduce the three-dimensional image of the driver 4.

According to this first embodiment, the image processing unit 15 is suitable for receiving the three-dimensional image of the sensor, and programmed to determine, by virtue of this image, the occupation state of at least one of the hands of the driver, according to the detection of the presence of the distracting object in said hand.

More specifically, the image processing unit 15 is programmed to implement the following steps:

b1) detect at least one of the hands of the driver in said image received from the image capture unit 11, and b2) detect the presence of said distracting object in the hand of the driver in order to deduce the occupation state of the hand of the driver.

The next part of the description is based on the detection of a hand of the driver. Of course, the same principle may be applied to the other hand of the driver.

The image processing unit 15 comprises for this purpose processing means programmed to detect the image of the hand of the driver in the image captured by the image capture unit 11, as well as the presence of the distracting object in this hand.

More specifically, the image processing unit 15 is programmed to implement step b1) according to the following substeps:

detect at least a part of an arm of the driver, in the image received from the image capture unit, and deduce the position, in said image received from the image capture unit, of the hand of the driver based on the place where the part of the arm of the driver is detected in this same image.

In practice, the processing means of the processing unit 15 are programmed to identify, from among the points of the point cloud, those associated with the image of the arm or of the forearm of the driver.

The recognition of the shape of the arm or forearm of the driver (step b1) is based on a shape recognition algorithm.

Based on the point cloud, the processing means are also programmed to recognize characteristic shapes of elements in the space, which elements can be present in the detection area D, such as a part of the gearshift 2, a part of the steering wheel 3, a part of an armrest, etc. The "shape" of the elements in the space corresponds in this case to its outer envelope. The detection of these elements in the space can facilitate the detection of the arm of the driver.

Based on the identification of the arm or forearm of the driver, the processing means of the processing unit 15 identify a portion of the point cloud in which the hand of the driver is likely to be found. The recognition of the shape of the hand is in this case based on a shape algorithm, and carried out with the determined portion of the point cloud.

The processing means are also programmed to identify at least two different regions in said three-dimensional image captured by the image capture unit 11, for example a first region formed by the images of the points nearest the sensor (foreground) and the second region formed by the images of the points furthest away from the sensor (background), and to recognize the shape of the arm or forearm of the driver 4 in these regions.

Thus, the processing means are suitable for determining the location of arm of the driver, then deducing therefrom the location of the hand of the driver in the actual space of the detection area D.

Moreover, the image processing unit 15 is programmed to implement step b2) according to the following substeps:
detect the presence of any object in the hand of the driver, and
determine the nature of said detected object in the hand of the driver, in order to deduce the state of attentiveness of the driver.

Thus, the processing means are also programmed to identify the nature of the detected objects, according to the shape recognized at the estimated place of the hand in the image.

In practice, the processing unit 15 is programmed to deduce the occupation state of the hand of the driver, according to the shape recognized at the hand of the driver in the three-dimensional image.

This recognized shape can be that associated with a distracting object, a mobile phone, a glass or a cup, a book, a road map, etc., or that of elements always present in the detection area D.

As a variant, it would also be possible to deduce the occupation state of the hand of the driver according to the distance between the hand and any detected objects in the captured image.

More specifically, the image processing unit 15 is programmed to determine that the hand of the driver is in an occupied state when it is probable, given the shape recognized at the hand of the driver in the three-dimensional image, that the driver is holding this distracting object with his/her hand.

As a variant, the image processing unit could be programmed to determine that the hand is in an occupied state when the distance between the hand and the distracting object, in the captured three-dimensional image, is less than a predetermined threshold value.

On the other hand, it is programmed to determine that the hand of the driver is in a free state when it is improbable, given the shape recognized at the hand of the driver, that the driver is holding a distracting object with this hand.

As a variant, the image processing unit could be programmed to determine that the hand is in a free state when the distance between the hand and the detected distracting object, in the captured three-dimensional image, is greater than a predetermined threshold value.

When his/her hand is in this free state, the driver can react more quickly on the manual driving equipment of the vehicle, such as the steering wheel, turn signals, the horn, the hazard warning lights or the gearshift, if needed.

The device according to the invention is thus suitable for determining that the overall state of attentiveness of the driver is lower when his/her hand is in an occupied state than when it is in a free state.

As a variant, still according to this first embodiment of the device according to the invention, instead of implementing steps b1) and b2), the image processing unit 15 comprises processing means including a neural network trained to directly recognize the occupation state of the hand, and even the state of attentiveness of the driver, based on an image in the detection area D.

In practice, the neural network is trained prior to its use in the device 10 according to the invention.

To this end, the neural network is fed at its input by a plurality of images of the detection area D, in which images the hand is in a free state (i.e. the hand does not have any distracting object, or is holding a hand-operated item of driving equipment of the vehicle), and it is indicated to the neural network that for these images the state of the hand is free. According to the same principle, the neural network is also fed by a plurality of images of the detection area D, in which images the hand is in an occupied state (i.e. it is holding a distracting object), and it is indicated to the neural network that for these images the state of the hand is occupied.

Once trained, the neural network, then receiving at its input the image of the detection area D captured by the image capture unit 11, is programmed to give at its output the free or occupied state of the hand of the driver, or even directly the high (if the hand is in a free state) or low (if the hand is in an occupied state) state of attentiveness of the driver.

According to a second embodiment of the device 10 according to the invention, represented in FIG. 2 both in solid line and dotted line, the image capture unit 11 comprises at least:
one sensor 12 (in solid line in FIG. 2) suitable for capturing at least one image of a first kind including a first type of information relating to the elements in the space which are contained in the detection area D, and
one sensor 13 (in dotted line in FIG. 2) suitable for capturing at least one image of a second kind different from the first kind, including a second type of information relating to the elements in the space which are contained in the detection area D.

As in the first embodiment, the elements in the space which are contained in the detection area D notably comprise the hand of the driver and/or the distracting object, the presence of which is desired to be detected. They can also comprise elements in the environment of the driver naturally present in the detection area D, such as the steering wheel, the gearshift or the armrest of one of the seats.

In practice, the image capture unit 11 comprises either a single sensor (not represented) suitable for capturing both the images of first and second kinds, or at least two different sensors 12, 13 suitable capturing the images of first and second kinds respectively.

When the image capture unit 11 comprises two different sensors 12, 13, it is conceivable that they are arranged in the same place in the passenger compartment of the vehicle 1, for example in the ceiling lamp, behind the steering wheel 3 or in a central region of the instrument panel, as described previously. It is also conceivable that each different sensor is arranged at a different place in the vehicle passenger compartment, notably among the places described above.

The images of the first and second kinds are chosen from among:
a three-dimensional image including information relating to the distance, with respect to said sensor, of at least a part of the elements in the space which are contained in the detection area D, i.e. in this case at least of the distracting object and/or of the hand of the driver,
a two-dimensional image including information relating to the brightness of at least a part of the elements contained in the detection area D, i.e. at least of the distracting object and/or of the hand of the driver, and,
a thermal image including information relating to the temperature of at least a part of the elements contained in the detection area D, i.e. at least of the distracting object and/or of the hand of the driver.

To capture a three-dimensional image, the sensor 12, 13 can be one of those described previously in the first embodiment of the device 10, i.e. a time-of-flight sensor, a stereoscopic sensor or a structured light sensor.

This type of sensor can in certain cases also be suitable for capturing two-dimensional images.

A conventional photographic type sensor, or a camera, is also capable of capturing two-dimensional images.

Two-dimensional images are images giving information on the brightness of the elements present in the detection area D, including the hand and the forearm of the driver. Conventionally, two-dimensional images comprise pixels representing regions of the detection area D, i.e. a pixel corresponds to the image of a region of the detection area D. Each pixel is more or less bright depending on the corresponding brightness of the region of the detection area D which it represents. In this case, the two-dimensional images are in black-and-white, but color two-dimensional images could also be possible, in which case each pixel would represent the chrominance of each corresponding region of the detection area.

With the two-dimensional images providing details about the detection area D, it is thus easier for the image processing unit 15 to recognize the nature of the objects contained in the detection area D than when only the three-dimensional images are processed.

This is for example by virtue of conventional shape recognition algorithms.

To capture thermal images, the sensor can be a thermal imaging camera, for example a longwave infrared (LWIR) camera.

The luminous intensity of the pixels of the thermal images depends on the temperature of the regions of the detection area D corresponding to each pixel: the higher the temperature, the brighter the pixel, and the lower the temperature, the darker the pixel.

Thus, for example, the forearm and the hand of the driver will be represented by bright pixels, as would the battery of the mobile phone or a glass filled with hot liquid. On the other hand, the gearshift, a book or a road map will be represented by darker pixels.

Thus, by virtue of thermal images, it is also easier for the processing unit to recognize the nature of the elements in the space which are contained in the detection area D, and notably to discern the forearm of the driver terminated by the hand of the driver from the rest of these elements in the space.

Additionally or as a variant of the second embodiment of the device 10 according to the invention, the image capture unit 11 can additionally comprise at least one sensor suitable for capturing an image of a third kind, different from said first and second kinds, including a third type of information relating to the elements in the space which are contained in the detection area D.

Preferably, the image capture unit 11 will comprise in this case at least two different sensors, possibly arranged at different places in the passenger compartment of the vehicle, to capture images of first, second and third kinds.

The image of a third kind is chosen from among the images described previously, i.e. a three-dimensional image, a two-dimensional image or a thermal image. The sensors described previously are for example used.

According to this variant, the image processing unit 15 takes into account at least three images of different kinds, i.e. a three-dimensional image, a two-dimensional image and a thermal image, to determine the occupation state of the hand of the driver.

According to the second embodiment of the device according to the invention, regardless of the variant considered, i.e. the image capture unit 11 captures images of two or three different kinds, the image processing unit 15 is programmed to implement steps b1) and b2) explained previously, i.e.:

b1) locate said hand of the driver in at least one of said images received from the image capture unit 11, b2) detect a distracting object in the hand of the driver 4 in order to deduce the occupation state of the hand of the driver, and then the state of attentiveness of the driver.

To this end, the image processing unit 15 comprises processing means programmed to implement steps b1) and b2) according to an implementation referred to as sequential or according to an implementation referred to as concurrent.

It is additionally possible to conceive that steps b1) and b2) are carried out based on one or two images of the same kind.

However, it is advantageous, for carrying out these steps, to use images of different kinds which provide access to different information about the detection area.

It is generally considered, either to carry out one of steps b1) and b2) based on one or more images of a first kind and to carry out the other step b1) or b2) based on one of more images of a same kind, different from the first kind, or to carry out at least one of the two steps b1) and b2) based on several images of different kinds, or to carry out each step b1) and b2) based on several images of different kinds. The combination of several images of different kinds to carry out steps b1) and/or b2) provides for improving the precision of the detection of the hand and/or of the distracting object.

Example of Sequential Implementation

For greater clarity, sequential implementation is described for the case in which the image capture unit 11 captures images of two different kinds. Of course, the same principle may be applied when it captures images of three different kinds.

According to this example of sequential implementation, the image processing unit 15 implements step b1) based on at least one captured first image of a first kind, and step b2) based on at least one captured second image of a kind different from the first kind.

In practice, the first image of a first kind is for example one of the three-dimensional images captured by the image capture unit 11. The processing means are programmed to segment this three-dimensional image, i.e. to identify at least two different regions in said three-dimensional image, and to recognize the shape of the forearm or of the arm of the driver 4 in each of these regions, as was described for the first embodiment of the device 10, and to deduce therefrom the position of the hand of the driver, logically at the end of the recognized arm.

The abovementioned two regions correspond for example, as mentioned previously, to a region close to and a region far from the sensor.

It is advantageous to recognize a part of the arm (for example the forearm) of the driver based on the three-dimensional image since it is thus possible to know the region, near or far relative to the sensor, in which the arm of the driver is located.

After having located the hand of the driver by means of the first three-dimensional image, the processing means of the image processing unit 15 are programmed to detect the possible presence of an object in the hand of the driver by means of the second image of a second kind captured by the image capture unit 11. To this end, the processing means of the image processing unit 15 are programmed to recognize the characteristic shapes of objects possibly present in the detection area D, at the position of the hand as assessed, as explained above, based on two-dimensional and/or thermal images.

The processing means are then programmed to determine, by combining the information of the first and second images (of first and second kinds), whether or not an object is present in the hand of the driver and, in the affirmative case, to determine the nature of this object in order to estimate whether it amounts to a distracting object (or to an item of driving equipment).

When no object is detected in the second image (of a second kind) captured by the image capture unit 11, i.e. no object is present in the detection area D, the image processing unit 15 is programmed to determine that the hand is in a free state.

When at least one object is detected in the second image (of a second kind) captured by the image capture unit 11, the processing unit 15 is programmed to identify the nature of the detected object.

The image processing unit 15 is then programmed to determine that the hand is in an occupied state if the detected object is a distracting object (and to determine that the hand is in a free state, i.e. available for driving purposes, if the detected object is an item of driving equipment).

Of course, as in the first embodiment of the device, the shape recognized at the hand in the images of first and second kinds provides for confirming the probability that it is holding a distracting object, or for significantly reducing this probability. The shape of the outline of the hand can thus be taken into account by the image processing unit 15 for determining the occupation state of the hand.

Advantageously, sequential implementation provides for using the most relevant information from each of the images of first and second kinds, depending on the step to carry out.

Of course, in practice, it would be possible to produce sequential implementation using thermal or two-dimensional images as images of a first kind, and three-dimensional, two-dimensional or thermal images as images of a second kind inasmuch as they are chosen to be of a kind different from the first kind.

It would also be possible to use images of a third kind to facilitate the step for recognizing the shape of the hand and/or of the forearm of the driver, and/or to facilitate the step for detecting the object in the detection area D.

Example of Concurrent Implementation

According to concurrent implementation, the image processing unit 15 implements steps b1) and b2) based on each image received from the image capture unit 11, and implements an additional step according to which it determines an index of confidence associated with the detection of the presence of the object in the hand of the driver according to which index it deduces the occupation state of the hand of the driver.

More specifically, the image processing unit 15 implements steps b1) and b2) independently for each of the images of first, second and third kinds.

In practice, steps b1) and b2) are implemented with the three-dimensional images, as was described for the case of the first embodiment of the device 10 according to the invention.

For the two-dimensional and thermal images, the processing means of the image processing unit 15 are programmed to identify, from among the pixels of each image, those associated with the image of the hand and/or the image of the forearm of the driver, and those associated with the image of a distracting object possibly present in the detection area D, based on shape recognition algorithms specific to said thermal and two-dimensional images. According to the location of the hand and the possible detection of a distracting object in the hand thus located, the image processing unit 15 is programmed to deduce the occupation state of the hand of the driver in these images.

At the end of the processing of each image of first, second and possibly third kinds, the image processing unit 15 determines the index of confidence of the processing, i.e. determines whether the processing has led to a result, and whether this result is certain or whether it is somewhat random.

For example, by modeling a hand by a palm and five fingers each composed of three phalanges, the index of confidence is at its maximum if the palm and five fingers are recognized in the image; the index is lower when fewer elements are recognized, for example when the palm and only two fingers are recognized.

The image processing unit 15 determines the actual occupation state (occupied or free) of the hand of the driver based on the image for which the processing has led to the highest index of confidence, i.e. the result of which is the most certain.

As a variant, still according to the second embodiment of the device according to the invention, instead of implementing steps b1) and b2) concurrently or sequentially, the image processing unit 15 comprises processing means including a neural network trained to directly recognize the occupation state of the hand based on an image of the detection area D.

In practice, the neural network is trained prior to its use in the device according to the invention according to the same principle as was described for the case of the first embodiment, except that it is trained with images of first, second and possibly third kinds.

The neural network thus trained is thus suitable for receiving at its input images of first, second and possibly third kinds, to determine the occupation state of the hand of the driver.

Advantageously, by using images of different kinds as input to the neural network, the reliability of the result given at the output of said neural network improves.

Lastly, the device according to the invention is applied in a particularly useful manner in an onboard system 100 for a vehicle including:

the device according to the invention, suitable for determining the occupation state of at least one of the hands of the driver 4 present in the detection area D, an autonomous driving unit 50 of said vehicle 1 programmed to control driving equipment of said vehicle independently of the driver, and a decision unit (not represented) programmed to allow the driver 4 to control, at least partly, the driving equipment of the vehicle 1 in the event that the hand of the driver is determined to be in a free state, and/or to alert the driver in the event that the hand of the driver is determined to be in an occupied state, and/or to make the autonomous driving switch to a safe mode.

In this case, the items of driving equipment comprise notably the steering wheel 3, the accelerator and brake pedals, the gearshift, the turn signals, the headlights and the windshield wipers. Thus, the driving equipment of the vehicle comprises all the elements of the vehicle used for the driving.

The autonomous driving unit 50 is suitable for controlling the various items of driving equipment in such a way that said vehicle is driven without the intervention of the driver.

In this situation, the driver is allowed to be in a state of insufficient vigilance, i.e. to be distracted, and he/she can read a book or view his/her mobile phone without placing the driving in danger.

It sometimes happens that the driver wishes to take back control, at least partly, of the driving equipment (or that the autonomous driving unit 50 requires the driver to take back control, for example due to traffic conditions). In that case, the decision unit is programmed to allow the driver to control, at least partly, the driving equipment only when his/her overall state of attentiveness is high, in particular when one of his/her hands at least is in a free state.

On the other hand, when at least one of his/her hands is in an occupied state (or as a variant when both hands are in an occupied state), the decision unit does not allow the driver to take back control, but can for example order the display of an alert message intended for the driver in order to prompt him/her to be attentive and/or make the autonomous driving to switch over to a safe mode in which the autonomous driving unit 50 controls for example the parking of the vehicle on the shoulder (or on the emergency shoulder).

Method

In FIG. 3, the main steps of the method implemented by the device according to the invention are represented in the form of a flow chart.

The method according to the invention for determining the occupation state of at least one of the hands of the driver of the vehicle comprises steps in which:

a) the image capture unit 11 onboard said vehicle 1 captures at least one image of the detection area D located in said vehicle 1, b) the image processing unit 15 receives said captured image and determines the occupation state of a hand of the driver 4, which hand being located in the detection area D, according to the detection of the presence of a distracting object in said hand.

More specifically, at step a) (block E1 in FIG. 3), the image capture unit 11 of the device 10 according to the invention captures at least one image of a first kind of the detection area D.

Preferably, it captures two, even three, images, of the same kind or of different kinds, of the detection area D, preferably of different kinds.

Preferably, each image of a different kind is captured at a given instant, i.e. all the images are captured simultaneously by the image capture unit 11 or over a relatively short time interval, notably much less than a minute. This provides for ensuring that the analyzed situation has not changed between captures of images of different kinds.

At step b), the image processing unit 15 receives the image or images captured at step a).

According to a first possible implementation of the method according to the invention using the device 10 of the first or second embodiment according to the invention, represented by the route (1) in FIG. 3, the image processing unit 15 implements the steps described previously, i.e.:

detect at least a part of the arm of the driver in at least one received image (block F1);

locate the hand of the driver in said image or images received from the image capture unit 11 (block F2), depending in this case on the place where the above-mentioned part of the arm is detected;

detect the presence of said distracting object in the hand of the driver in order to deduce the occupation state of the hand of the driver (block F3).

When two images of different kinds are captured at step a) by the image capture unit 11 according to the second embodiment of the device 10 according to the invention, the implementation of step b) can be sequential or concurrent, as was described previously.

According to a second possible implementation of the method according to the invention using the variants of the first and second embodiments of the device 10 in which the image processing unit 15 comprises a trained neural network, represented by the route (2) in FIG. 3, said image processing unit 15 directly recognizes the occupation state of the hand based on images received from the image capture unit 11 (block G in FIG. 3).

Regardless of the implementation considered for the method, at step b), the image processing unit 15 sends the occupation state of the hand of the driver to the devices of the vehicle requiring it (block E2 in FIG. 3), notably to the decision unit in the case of an autonomous vehicle, or to a device for monitoring the current driver of the vehicle.

Consideration may also be given for the device according to the invention to inform the driver of the occupied state of at least one of his/her hands, so as to prompt him/her to concentrate again on his/her driving.

Advantageously, provision is additionally made for an additional step according to which an overall state of attentiveness of the driver is determined taking into account the occupation state of the hand of the driver and/or a state of vigilance of the driver determined by other known means.

Advantageously, in the case of driverless vehicles, when the items of driving equipment of said vehicle are controlled independently of the driver, provision is additionally made for a step according to which the driver is allowed to control, at least partly, the vehicle driving equipment in the event that the hand of the driver is determined to be in a free state and/or the driver is alerted in the event that the hand of the driver is determined to be in an occupied state, and/or the autonomous driving is made to switch over to a safe mode.

The device, the system and the method according to the invention are particularly advantageous in partly or fully autonomous driving situations, during which the driver is allowed to relax his/her attentiveness, i.e. to exhibit an insufficient state of vigilance. The position of the driver in these situations can be changed to such an extent that he/she is no longer facing any monitoring device suitable for capturing an image of his/her head to assess his/her level of vigilance. It is then very useful to determine the occupation state of the hands of the driver to grasp his/her overall state of attentiveness.

Moreover, by virtue of the invention, information is provided that is additional to the information already provided by a possible device for monitoring the driver.

Lastly, the invention applies to any type of vehicle, including transport vehicles such as boats, trucks and trains.

The invention claimed is:

1. A device for determining a state of attentiveness of a driver of a vehicle comprising:

an image capture unit onboard said vehicle, said image capture unit being capturing at least one image of a detection area located in said vehicle, and an image processing unit for receiving said captured image and programmed to:

locate, based on a first image of the at least one image, a hand of the driver in the first image received from the image capture unit, the first image being of a first type, detect, based on a second image of the at least one image, the presence of a distracting object in the hand of the driver, the second image being of a second type different from the first type, and determine the state of attentiveness of the driver, according to the detection of the presence of the distracting object in the hand of the driver, the hand being located in the detection area, wherein the distracting object is detected as being different from driving equipment of the vehicle based on a content temperature of the distracting object.

2. The device as claimed in claim 1, in which the image capture unit comprises at least one sensor for capturing a three-dimensional image of the detection area, said three-dimensional image including information relating to the distance, with respect to said sensor, at least of said distracting object or of said hand located in the detection area.

3. The device as claimed in claim 1, in which the image capture unit comprises at least:
   a sensor for capturing the at least one image of the first type including first information relating to said distracting object or to said hand located in the detection area, and
   a sensor for capturing the at least one image of the second type different from the first type, including second information relating to said distracting object or to said hand located in the detection area.

4. The device as claimed in claim 3, in which the image of the first type is chosen from among:
   a three-dimensional image including information relating to the distance, with respect to said sensor, at least of said distracting object or of said hand located in the detection area,
   a two-dimensional image including information relating to the brightness at least of said distracting object or of said hand located in the detection area, and
   a thermal image including information relating to the temperature at least of said distracting object or of said hand located in the detection area.

5. The device as claimed in claim 3, in which the image capture unit additionally comprises at least one sensor for capturing an image of a third type different from said first and second types, including third information relating to said distracting object or to said hand located in the detection area.

6. The device as claimed in claim 5, in which the image of a third type is chosen from among:
   a three-dimensional image including information relating to the distance, with respect to said sensor, at least of said distracting object or of said hand located in the detection area,
   a two-dimensional image including information relating to the brightness at least of said distracting object or of said hand located in the detection area, and
   a thermal image including information relating to the temperature at least of said distracting object or of said hand located in the detection area.

7. The device as claimed in claim 1, in which the image processing unit is programmed to locate the hand of the driver according to the following sub-steps:
   detect at least a part of an arm of the driver, in the image received from the image capture unit, and
   deduce the position, in said image received from the image capture unit, of said hand of the driver based on the place where the part of the arm of the driver is detected in the image received from the image capture unit.

8. The device as claimed in claim 1, in which the image processing unit is programmed to detect the presence of the distracting object according to the following sub-steps:
   detect the presence of any object in the hand of the driver, and
   determine the nature of said detected object in the hand of the driver, in order to deduce the state of attentiveness of the driver.

9. The device as claimed in claim 1, in which the image processing unit locate the hand of the driver and detect the presence of the distracting object based on each image received from the image capture unit, and implements an additional step comprising determining according to which it determines an index of confidence associated with the detection of the presence of the distracting object in the hand of the driver according to which index it deduces the state of attentiveness of the driver.

10. The device as claimed in claim 1, in which the image processing unit comprises processing means using a neural network to determine the state of attentiveness of the driver, wherein the neural network is trained based on at least a first training image of the detection area where the hand is holding a hand-operated item of driving equipment of the vehicle and a second training image of the detection area where the hand is holding an object different from any driving equipment of the vehicle.

11. An onboard system for a vehicle including:
   a device as claimed in claim 1, for determining the state of attentiveness of a driver,
   an autonomous driving unit of said vehicle programmed to control driving equipment of said vehicle independently of the driver; and
   a decision unit programmed to allow the driver to control, at least partly, the driving equipment of the vehicle in the event that the hand of the driver is determined to be in a free state.

12. A method for determining a state of attentiveness of a driver of a vehicle, comprising:
   capturing, by an image capture unit onboard said vehicle, at least one image of a detection area located in said vehicle;
   receiving, by an image processing unit, said captured image;
   locating, by the image processing unit and based on a first image of the at least one image, a hand of the driver in the first image received from the image capture unit, the first image being of a first type,
   detecting, by the image processing unit and based on a second image of the at least one image, the presence of a distracting object in the hand of the driver, the second image being of a second type different from the first type; and
   determining, by an image processing unit, the state of attentiveness of the driver, according to the detection of the presence of the distracting object in the hand of the driver, the hand being located in the detection area,
   wherein the distracting object is detected as being different from driving equipment of the vehicle based on a content temperature of the distracting object.

* * * * *